March 22, 1932. J. E. FOSTER 1,850,263
AEROPLANE CONSTRUCTION
Original Filed Jan. 2, 1930
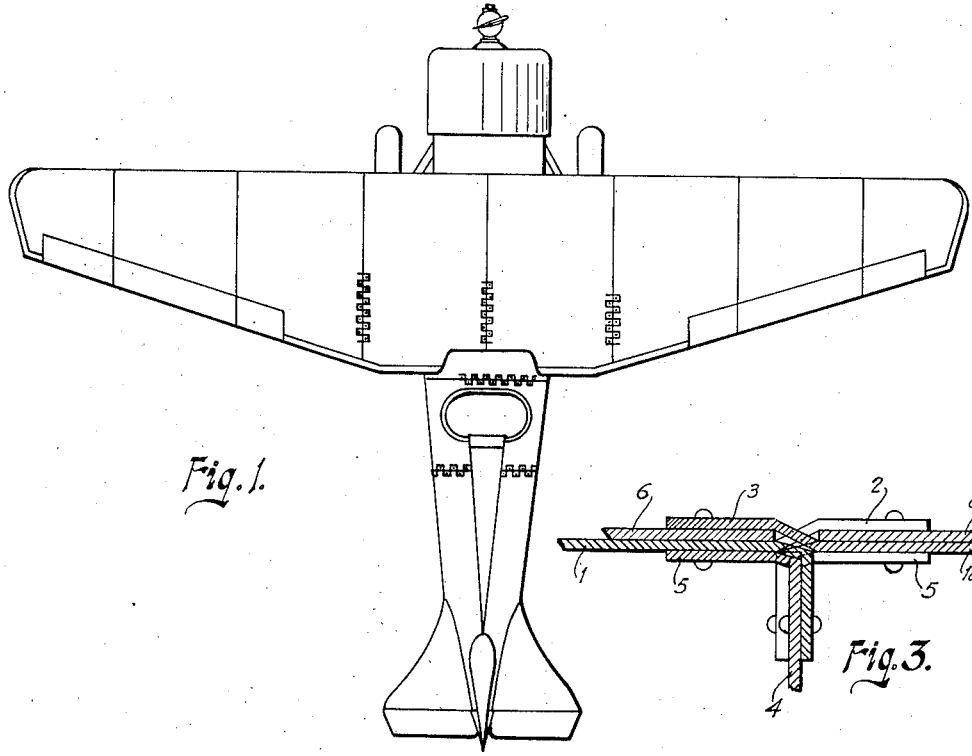
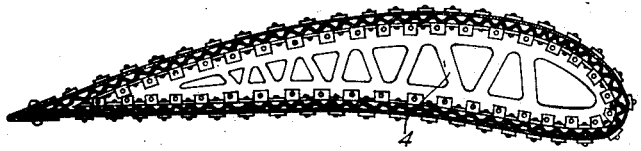
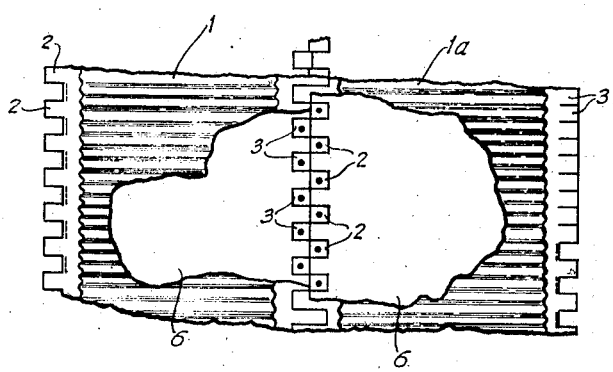
INVENTOR.
Jack E. Foster.
BY Thos. E. Deofield
ATTORNEY Patented Mar. 22, 1932

1,850,263

UNITED STATES PATENT OFFICE

JACK E. FOSTER, OF ALLIANCE, OHIO, ASSIGNOR OF ONE-HALF TO WALTER M. CROSS, OF KANSAS CITY, MISSOURI

AEROPLANE CONSTRUCTION

Application filed January 2, 1930, Serial No. 417,869. Renewed August 14, 1931.

This invention relates to improvements in aeroplane wing construction and refers more particularly to a type of construction which is built up in sections, the sections consisting of an outer stress skin supported upon ribs or friction plates, the stress skin being preferably corrugated longitudinally of the wing and covered by a smooth surfaced outer sheet or covering material.

The novelty in the invention lies primarily in the building up of these sections and the peculiar manner of joining or uniting the sections.

The invention contemplates the use of different gauge material utilizing the heavier materials near the center of the wing where the major portion of the stress is taken up and lighter materials near the ends of the wing or wings, thereby considerably reducing the weight of the structure.

The aeroplane structure contemplated by the present invention is adaptable not only to the wings of the plane but also to the fuselage and tail group.

Fig. 1 is a plan view of the plane constructed in the manner hereinafter described.

Fig. 2 is a sectional view taken through the wing.

Fig. 3 is an enlarged detail of the joint showing how the structural sections are united.

Fig. 4 is a plan detail of the joint shown in Fig. 3 with parts broken away.

Referring to the drawings: a structural section consists of a corrugated stress skin shown as 1, which is to be united to an adjoining stress skin portion or member designated as 1a in Figs. 3 and 4. The stress skin member 1 is slotted along its lateral edges to form the flaps 2 while the stress skin member 1a is slotted to form the flaps 3. In uniting the two sections of the stress skin, the alternate flaps 2 and 3 are bent to an angle of substantially 90 degrees with the stress skin: thus one set of the flaps remains in the plane of the stress skin while alternate flaps of the same are turned down at an angle of 90 degrees.

In uniting the sections, ribs or friction plates 4 are used, which are also slotted to form flaps or appendages 5, the alternate flaps of the ribs or friction plates being bent at 90 degrees thereto in opposite directions so that substantially an equal number of flaps extend at 90 degrees on each side.

To combine or unite the structural sections, the friction plates 4 are interposed between the bent flaps of the stress skin members so that the flaps of the stress skin extend over the rib to be attached to the opposite side of the friction plate while the flaps or tabs of the stress skin which are substantially in the plane of the stress skin overlap the adjoining stress skin member. The flaps of the ribs underlie the adjacent stress skin portions and are attached thereto.

In order that a smooth surface covering shall overlie the entire assembly, smooth thin sheets or strips 6 are placed over the corrugated portion of the stress skin and affixed to the sections by insertion beneath the upper exposed flaps 2 and 3 of the adjoining stress skin members. It is contemplated that these flaps shall be riveted, spot welded or otherwise fastened and it will be noted that there is no direct tension or shear upon the metal rivets which hold the structural sections in place. The stress skin covering being corrugated longitudinally of the wing eliminates the necessity for the use of spars, although the invention contemplates a combination in which spars may be used with this type of built up sectional construction. By using this type of joint between the structural sections, due to the positioning and arrangement of the flaps or lug extensions extending across the friction plates and having the alternate flaps of the adjoining or abutting stress skin portions extending over and fastening to the friction plate, and the alternate flaps of each of the stress skin members being affixed to the abutting stress skin member, the tension and compression forces will be more or less absorbed by the friction due to the snubbing action between the plates and the corrugated stress skin sheets. The corrugations running longitudinally of the wing and fuselage strengthens the sheets against compression, tension, and torsion.

As suggested, in this type of wing heavier gauge metals may be used where the greater stresses exist and lighter metals where the stresses are less. Actual tests have shown that this type of wing can be made to pass the stress requirements of the government and have a weight considerably less than is required, by the use of fabric and wood or the combination of metal and fabric.

Fig. 1 shows a plan view of a high wing monoplane in which both the wing and fuselage are fabricated by use of the sectional construction and improved type of joints hereinbefore described. The friction plates, cross members or ribs 4 of the wing may be of the type shown in Fig. 2 or the cross members arranged according to the stresses. In the fuselage construction the friction plates will constitute circular rings with cross struts wherever it is essential to reinforce the strength.

I claim as my invention:

1. Construction for aeroplanes comprising sectional assemblies having a corrugated stress skin supported by ribs or friction plates intermediate the stress skins and a smooth outer covering, said sections united by a plurality of flaps overlapping the adjacent sections and ribs.

2. Construction for aeroplanes comprising sectional assemblies having a corrugated stress skin supported by ribs or friction plates intermediate the stress skins and a smooth outer covering, said sections united to each other and to the ribs or friction plates by a plurality of interlaced flap extensions affixed to the adjoining members.

3. Construction for aeroplanes comprising sectional assemblies having a corrugated stress skin, ribs intermediate the stress skins at the meeting edges, flap extensions on the edges of the stress skins and ribs for uniting these sections.

4. Construction for aeroplanes comprising sectional assemblies having a corrugated stress skin, ribs intermediate the stress skins at the meeting edges, flap extensions on the edges of the stress skins and ribs, and integral therewith, for uniting the sections.

5. Construction for aeroplanes comprising sectional assemblies having a corrugated stress skin, ribs intermediate the stress skins at the meeting edges, flap extensions on the edges of the stress skins and ribs for uniting the sections, substantially an equal portion of the flap extensions of each stress skin portion attached to the rib and adjacent stress skin members.

6. Construction for aeroplanes comprising sectional assemblies having a corrugated stress skin, ribs intermediate the stress skins at the meeting edges, flap extensions on the edges of the stress skins and ribs, alternate flaps of the stress skin members bent at 90 degrees thereto whereby joining with the adjacent stress skins brings the bent down flaps substantially in alignment, alternate flaps on the ribs bent at 90 degrees in opposite directions and adapted to be affixed to the adjacent stress skin members.

7. Construction for aeroplanes comprising sectional assemblies having a corrugated stress skin, ribs intermediate the stress skins at the meeting edges, flap extensions on the edges of the stress skins and ribs for uniting the sections, substantially an equal portion of the flap extensions of each stress skin portion attached to the rib and adjacent stress skin members, alternate flaps of the stress skins bent at an angle of 90 degrees thereto whereby the bent down flaps are brought substantially in alignment when the separate portions are united, said ribs having flap extensions bent alternately in opposite directions at 90 degrees, alternate flaps of the ribs affixed to the same stress skin member and alternate flaps of the stress skin members affixed to the ribs and the remaining flaps to the adjacent stress skin portion to which it is being united.

8. Construction for aeroplanes comprising sectional assemblies having a corrugated stress skin, ribs intermediate the stress skins at the meeting edges, flap extensions on the edges of the stress skins and ribs for uniting these sections, a smooth surface covering overlying the corrugated sections, said covering held in place beneath the upper exposed flaps of the stress skin members.

9. Construction for aeroplanes comprising sectional assemblies having a corrugated stress skin supported by ribs or friction plates intermediate the stress skins and a smooth outer covering, said sections united by a plurality of flaps overlapping the adjacent sections and ribs, a smooth surface covering overlying the corrugated sections, said covering held in place beneath the upper exposed flaps of the stress skin members.

In testimony whereof I affix my signature.

JACK E. FOSTER.